(12) United States Patent
Versland et al.

(10) Patent No.: US 11,689,084 B2
(45) Date of Patent: Jun. 27, 2023

(54) ELECTROMOTOR HAVING INTEGRATED INVERTER

(71) Applicant: Flekkefjord Elektro AS, Flekkefjord (NO)

(72) Inventors: Alf Magne Midtbø Versland, Øyestranda (NO); Eirik Fønstelien, Grimstad (NO); Karoline Ulvan, Flekkefjord (NO); Anders Fuglesteg Nilsen, Kongsberg (NO); Bjørn Harald Snersrud, Drammen (NO); Geir Pettersen, Horten (NO)

(73) Assignee: Flekkefjord Elektro AS, Flekkefjord (NO)

( * ) Notice: Subject to any disclaimer, the term of this patent is extended or adjusted under 35 U.S.C. 154(b) by 611 days.

(21) Appl. No.: 16/634,425

(22) PCT Filed: Jul. 12, 2018

(86) PCT No.: PCT/NO2018/050187
§ 371 (c)(1),
(2) Date: Jan. 27, 2020

(87) PCT Pub. No.: WO2019/022613
PCT Pub. Date: Jan. 31, 2019

(65) Prior Publication Data
US 2021/0119515 A1 Apr. 22, 2021

(30) Foreign Application Priority Data

Jul. 27, 2017 (NO) .................................. 20171257

(51) Int. Cl.
*H02K 11/33* (2016.01)
*H02K 21/14* (2006.01)
(Continued)

(52) U.S. Cl.
CPC ................ *H02K 11/33* (2016.01); *H02K 3/28* (2013.01); *H02K 3/52* (2013.01); *H02K 21/14* (2013.01); *B66D 1/12* (2013.01)

(58) Field of Classification Search
CPC ........ H02K 11/30; H02K 11/33; H02K 11/38; H02K 3/28; H02K 3/52; H02K 21/14;
(Continued)

(56) References Cited

U.S. PATENT DOCUMENTS 6,356,005 B1 * 3/2002 Hsu ........................ H02K 11/33
310/67 R
2002/0084716 A1 7/2002 Harter et al.
(Continued)

FOREIGN PATENT DOCUMENTS

| JP | 5426020 | 2/1979 |
| JP | 138423 | 8/2008 |
| TW | 498589 | 8/2002 |

OTHER PUBLICATIONS

Purcell M, et al., "A Submersible, All Electric, Remotely Operated Vehicle Tether Management System", Mastering the Oceans Through Technology. Newport, Rhode Island, Oct. 26-29, 1992; [Proceedings of the Oceans Conference], New York, IEEE, US.
(Continued)

*Primary Examiner* — Alexander A Singh
(74) *Attorney, Agent, or Firm* — Andrus Intellectual Property Law, LLP (57) ABSTRACT

An electric motor has a stator and a rotor for rotation relative to the stator. The stator has a plurality of stator windings distributed along the circumference of the stator. Each stator winding is connected to a respective end terminal. Driver circuitry is coupled to the plurality of stator windings for creating a rotating magnetic field for driving the rotor. The driver circuitry has one driver module per stator winding. Each driver module is mounted close to its respective stator
(Continued)

winding. Each driver module is connected to the respective end terminal of its respective stator winding without a parasitic impedance of any significance being present in between said driver module and said stator winding.

19 Claims, 8 Drawing Sheets

(51) Int. Cl.
*H02K 3/28* (2006.01)
*H02K 3/52* (2006.01)
*B66D 1/12* (2006.01)

(58) Field of Classification Search
CPC .... H02K 2213/12; H02K 5/225; H02K 11/26; H02K 11/27; B66D 1/12; H02P 6/085
USPC .................. 310/71, 68 R, 68 B, 68 D
See application file for complete search history.

(56) References Cited

U.S. PATENT DOCUMENTS

| | | |
|---|---|---|
| 2006/0002054 A1 | 1/2006 | Mohammad |
| 2011/0241499 A1 | 10/2011 | Nakamura et al. |
| 2012/0307476 A1* | 12/2012 | Masuzawa ............. H02K 11/33 361/816 |
| 2013/0313948 A1* | 11/2013 | Zucker .................... H02K 7/14 310/68 D |
| 2014/0062269 A1 | 3/2014 | Crane |
| 2014/0131646 A1* | 5/2014 | Richardson ............. B66D 1/14 254/362 |
| 2016/0043671 A1* | 2/2016 | Kemp ................. H02P 21/0085 318/400.14 |
| 2016/0079889 A1 | 3/2016 | Pietromonaco |
| 2016/0173019 A1 | 6/2016 | Gurakuq et al. |
| 2016/0197570 A1 | 7/2016 | Beat et al. |
| 2018/0105064 A1* | 4/2018 | Matsubara ............. H02K 7/116 |
| 2018/0159392 A1* | 6/2018 | Sun ........................ H02K 1/276 |
| 2018/0166968 A1* | 6/2018 | Blum .................... H02M 7/003 |
| 2020/0041185 A1* | 2/2020 | Jadric .................... F25B 41/39 |

OTHER PUBLICATIONS

Brown et al., "Power Converter Design for an Integrated Modular Motor Drive", Industry Applications Conference, 2007. 42nd IAS Annual Meeting. Conference Record of the 2007 IEEE, Sep. 1, 2007, XP031146096.

Norwegian Search Report for No. 20171257, dated Feb. 19, 2018.

International Search Report and the Written Opinion for PCT/NO2018/050187, dated Sep. 28, 2018.

European Office Action for corresponding European Application No. 18837209.8 dated Jan. 23, 2023.

"EMiLE—Elektro-Maschinen integrierte LeistungsElektronik: BMBF-Verbundforschungsprojekt : AbschluBbericht : Laufzeit des Vorhabens: May 1, 2013-Oct. 31, 2016", Dec. 31, 2016 (Dec. 31, 2016), pp. 1-151, XP093013560, Retrieved from the Internet: URL:https://doi.org/10.2314/GBV:894221515 [retrieved on Jan. 12, 2023].

3rd Party Observation submitted to the EPO during examination of corresponding European Application No. 18837209.8 dated Oct. 27, 2021.

* cited by examiner

ELECTROMOTOR HAVING INTEGRATED INVERTER

CROSS-REFERENCE TO RELATED APPLICATIONS

This application is the U.S. national stage application of International Application PCT/NO2018/050187, filed Jul. 12, 2018, which international application was published on Jan. 31, 2019, as International Publication WO 2019/022613 in the English language. The International Application claims priority of Norwegian Patent Application No. 20171257, filed Jul. 27, 2017. The international application and Norwegian application are both incorporated herein by reference, in entirety.

FIELD OF THE INVENTION

The invention relates to an electric motor comprising a stator and a rotor for rotation relative to the stator, the stator comprising a plurality of stator windings distributed along the circumference of the stator, wherein each stator winding is connected to an end terminal, the electric motor further comprising driver circuitry coupled to the plurality of stator windings for creating a rotating magnetic field for driving the rotor. The invention further relates to an electric winch comprising at least one such electric motor.

BACKGROUND OF THE INVENTION

In the last couple of years, electric motors are getting more and more important. The electric vehicle industry is a clear example, where there has been an explosive growth over the past years and this trend is expected to continue in the years to come. The car industry clearly has been pushing electric motor technology towards smaller dimensions, more efficiency, and higher performance. However, similar trends are now visible in other industry sectors, such as the shipyard industry and connected therewith the offshore petroleum industry.

In an increasingly tougher competition, the Norwegian industry depends on developing new high-tech products. A change from hour demanding production to more technology demanding production will provide Norwegian shipyards increased competiveness. One of the main objectives is to develop compacter electric winches. Various attempts have been done to obtain compact electric winches, but there is clearly still a need for more space-saving winches, having higher efficiency, lower cost and being easy to install.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to an electric motor comprising a stator and a rotor for rotation relative to the stator (the rotor could be rotating within or around the stator), the stator comprising a plurality of stator windings distributed along the circumference of the stator, wherein each stator winding is connected to a respective end terminal, the electric motor further comprising driver circuitry coupled to the plurality of stator windings for creating a rotating magnetic field for driving the rotor. The invention is characterized by that the driver circuitry comprises one driver module per stator winding, wherein each driver module is mounted close to its respective stator winding, wherein each driver module is directly connected to the respective end terminal of its respective stator winding without an impedance of any significance in between said driver module and said stator winding.

In order to facilitate understanding of the invention one or more expressions, used throughout this specification, are further defined hereinafter.

Wherever the wording "winding" or "coil" is used, this is to be interpreted to be a (at least one) winding of a conductor formed such that an induction is formed.

The effects of the method in accordance with the invention are as follows. In an electric motor (such as a synchronous electric motor, but it could just as well be an asynchronous electric motor), the stator windings must be actuated by the driver circuitry in order to create a rotating magnetic field such that the rotor will rotate within or around the stator. The common way to actuate the stator windings is to use typically electrical drivers that drive said stator windings (through an electric cable of a certain length) in accordance with high-frequency switching signals on the inputs of the switches. The problem is that electric cables have parasitic impedance, such as inductance and capacitance. The reactance of the inductance is proportional to $\omega L$, where $\omega$ is the frequency and L is the inductance of the electrical cable. Furthermore, electrical cables typically also have a parasitic capacitance.

The reactance of the capacitance is proportional to $\omega C^{-1}$, where C is the capacitance of the electrical cable. The combination of the parasitic inductance and capacitance of the electric cable causes the cable to behave as a transmission line with an electric wave nature causing unwanted wave effects such as power loss, high-voltage transients, and electromagnetic interference (EMI). In order to reduce unwanted wave effects, as well as reflections at the end of the transmission line, due to impedance mismatches, i.e. improper termination of the transmission line, the prior art teaches to oversize the stator windings and to use special filters, taking up much more space and rendering the system more expensive, or reduce the switching frequencies such that unwanted wave effects are reduced, which renders the system slower and lowers its reaction time.

The current invention improves the aforementioned problems by implementing driver modules close to the motor winding (stator winding) they are driving, and particularly such that the driver modules are directly connected to the respective terminal of the stator winding without a parasitic impedance of any significance being present in between said driver module and said stator winding. Expressed differently, the driver modules are effectively integrated in the electric motor next to the stator windings. This is in fact relatively easy because the stator is not rotating. The consequence of this feature is that there is significant reduction in unwanted wave nature in the electrical connection between the driver module and the stator windings. This does not mean that there are no parasitic capacitances or inductances at all, but at least a major source of these is taken out. In addition, it becomes now possible to configure and dimension the driver module such that it directly drives the impedance of the stator winding. Not only is this an easier task, it also opens up the possibility to make the driver module together with the stator windings act like a filter itself as some of the embodiments discussed hereinafter will show, i.e. unwanted wave nature can be reduced by choosing the right impedances in the driver modules concerning the target switching frequencies.

A further effect of the technical features of the invention is that the electric motor can be further miniaturized or the efficiency can be increased, i.e. the performance can be increased with an electric motor of the same size.

In an embodiment of the electric motor in accordance with the invention each driver module comprises an inverter circuit directly coupled with its output to the respective stator winding. Inverter circuits are suitable switches for driving a stator winding. They are fast and typically dissipates less power than other switching circuits.

In an embodiment of the electric motor in accordance with the invention each inverter circuit comprises a plurality of silicon-carbide transistors, for instance connected as a inverter half bridge in an embodiment. Silicon-carbide transistors are faster in both rise time and switching frequency than conventional silicon power semiconductors. When controlled properly the decreased rise time will cause decreased dynamic switching losses. In addition, the static loss is also much lower in silicon-carbide technology compared to silicon technology.

In an embodiment of the electric motor in accordance with the invention each driver module further comprises a snubber circuit connected in parallel with the inverter circuit. Snubber circuits are frequently used in electrical systems with an inductive load where the sudden interruption of current flow leads to a sharp rise in voltage across the current switching device, in accordance with Faraday's law. This transient can be a source of EMI in other circuits. Additionally, if the voltage generated across the device is beyond what the device is intended to tolerate, it may damage or destroy it. The snubber circuit provides a short-term alternative current path around the current switching device so that the inductive element may be discharged more safely and quietly. Inductive elements are often unintentional, but arise from the current loops implied by physical circuitry. While current switching is everywhere, snubber circuits will generally only be required where a major current path is switched, such as in power supplies.

In an embodiment of the electric motor in accordance with the invention each driver module further comprises a capacitance circuit connected in parallel with the inverter circuit. The capacitance circuit can be advantageously tuned to the load that the driver module has to drive (the inductance of the stator winding), but also the capacitance can be dimensioned to "cancel" any parasitic inductance in the driver module or the electrical connections.

In an embodiment of the electric motor in accordance with the invention the capacitance circuit comprises a distributed capacitor bank. The capacitor bank within the driver module will be an energy buffer that releases energy immediately when the switches close, and because of the fact that there is reduced parasitic impedance, or at least not being of any significance, present in between the driver module and the stator winding, the energy will flow directly into the motor winding (stator winding) with reduced reflection of high frequency components of the waveform. The inductance of the stator winding will smooth out the high-frequency components to a sinusoidal waveform of the magnetic flux.

In an embodiment of the electric motor in accordance with the invention each driver module comprises a first power supply line and a second power supply line, and wherein the driver module is fed by a DC-voltage provided between the second supply line and the first supply line. The use of a pair of power supply lines for providing a DC-voltage forms a convenient implementation of the driver module. The power supply lines are also being referred to as DC-bus. Using such DC-bus opens up the possibility to place more electric circuits for extra functionality.

In an embodiment of the electric motor in accordance with the invention the capacitance circuit is connected between said power supply lines.

An embodiment of the electric motor in accordance with the invention further comprises a controller for controlling said inverter circuits. As already discussed the inverter circuits need to be controlled, i.e. switched on and off at high-frequency. The controller in this embodiment provides for the required signals of the inverter circuits.

An embodiment of the electric motor in accordance with the invention further comprises a DC voltage sensor provided in between said power supply lines for measuring the power supply voltage, and a DC current sensor provided in one of said power supply lines or stator winding for measuring the load current (stator winding current), wherein the measured power supply voltage and the measured load current are fed to the controller for controlling said inverter circuits. The algorithm for controlling the inverter circuits is advantageously making use of said DC voltage and said DC current measured in said driver module. In an alternative solution the AC-current measured in between the driver module and the stator winding can be used as an input to the controller.

In an embodiment of the electric motor in accordance with the invention each driver module is mounted besides the respective stator end terminal. All the components of the driver module may be conveniently provided on a printed-circuit board, possibly a double-sized or multiple-layer printed-circuit board with electric components on both sides. All components or some of the components of the driver module may be conveniently provided as a hybrid circuit mounted besides the respective stator end terminal. All components or some of the components of the driver module may be conveniently provided as a custom made semiconductor (Custom IC) mounted besides the respective stator end terminal, or embedded with the stator winding. All components or some of the components of the driver module may be conveniently provided as a programmable system on a chip (SOC) mounted besides the respective stator end terminal. All components or some of the components of the driver module may be conveniently provided as code (i.e. VHDL, Verilog, C programming language etc.) within an electronic or programmable circuit like FPGA or CPLD mounted besides the respective stator end terminal.

In an embodiment of the electric motor in accordance with the invention the electric motor is a synchronous motor. Even though the invention is not limited to synchronous motors, the invention may be conveniently applied in synchronous electric motors, which are often used in electric winches.

In an embodiment of the electric motor in accordance with the invention the electric motor is a permanent magnet motor. Even though the invention is not limited to permanent magnet motors, the invention may be conveniently applied in permanent magnet motors, which are often used in electric winches.

In a second aspect the invention relates to an electric winch comprising at least one electric motor according to the invention, the at least one electric motor being integrated within the winch drum of the electric winch. Electric winches form an important application area of the invention, where compactness of the electric motor of the invention enables the integration of said motor in the winch drum of the electric winch, which leads to an enormous space saving, which is very advantageous on ships and rigs for example.

BRIEF INTRODUCTION OF THE DRAWINGS

In the following is described examples of embodiments illustrated in the accompanying drawings, wherein.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as not to obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e. a definition that is different from the ordinary and customary meaning as understood by those skilled in the art, is intended to be implied by consistent usage of the term or phrase herein. To the extent that a term or phrase is intended to have a special meaning, i.e. a meaning other than that understood by skilled artisans, such a special definition will be expressly set forth in the specification in a definitional manner that directly and unequivocally provides the special definition for the term or phrase.

Figure 1:
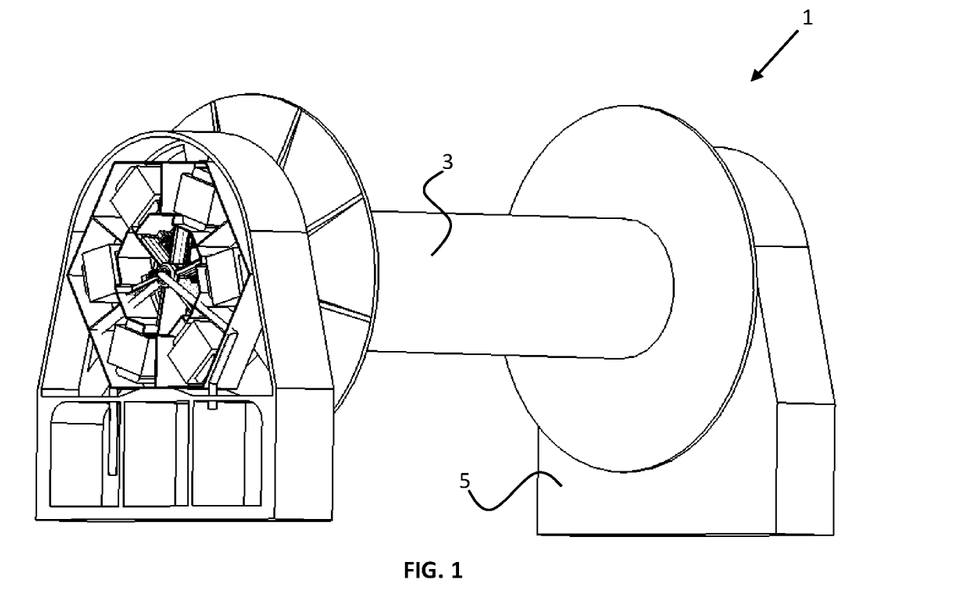
FIG. 1 shows an electric winch in accordance with the invention.
Figure 2:
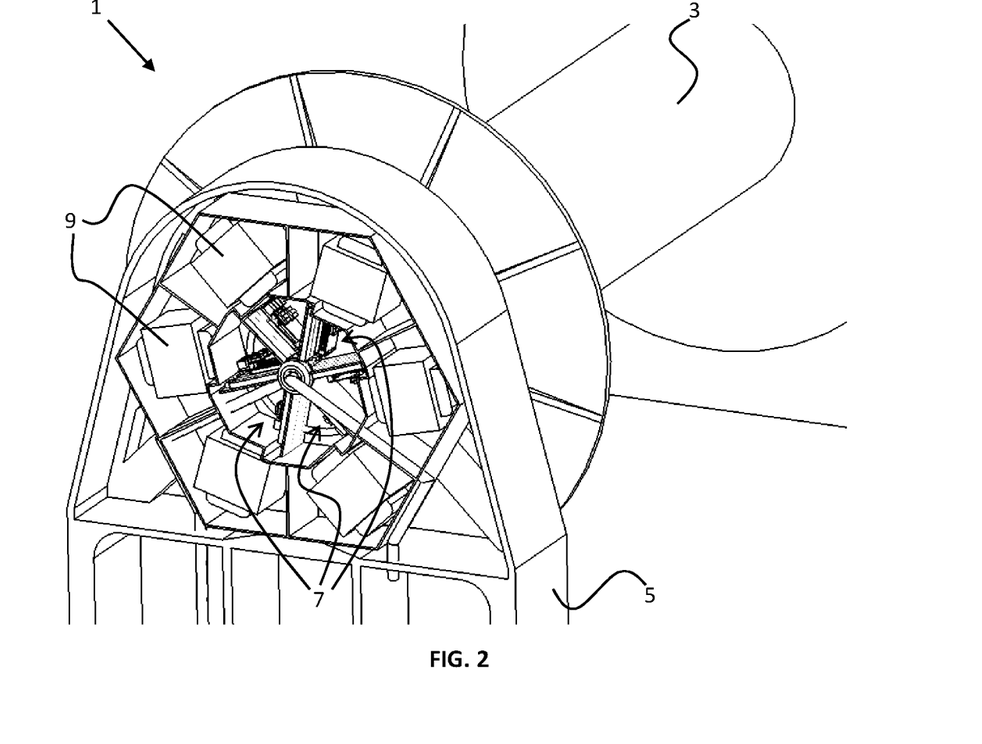
FIG. 2 shows the electric winch of FIG. 1 from a different angle.

FIG. 1 shows an electric winch in accordance with the invention. FIG. 2 shows the electric winch of FIG. 1 from a different angle. The electric winch 1 comprises a winch drum 3 that is mounted on a winch pedestal 5 as illustrated. The invention provided for an electric motor (not shown) that is designed such that it fits within the winch drum 3. As will be explained with reference to the further figures this is made possible because of special integration measures. FIG. 2 shows some further electronic components 7, such as rectifier modules, distributed C-banks and the like and inductors 9 (for the rectifiers), that are connected to the electric motor.

Figure 3:
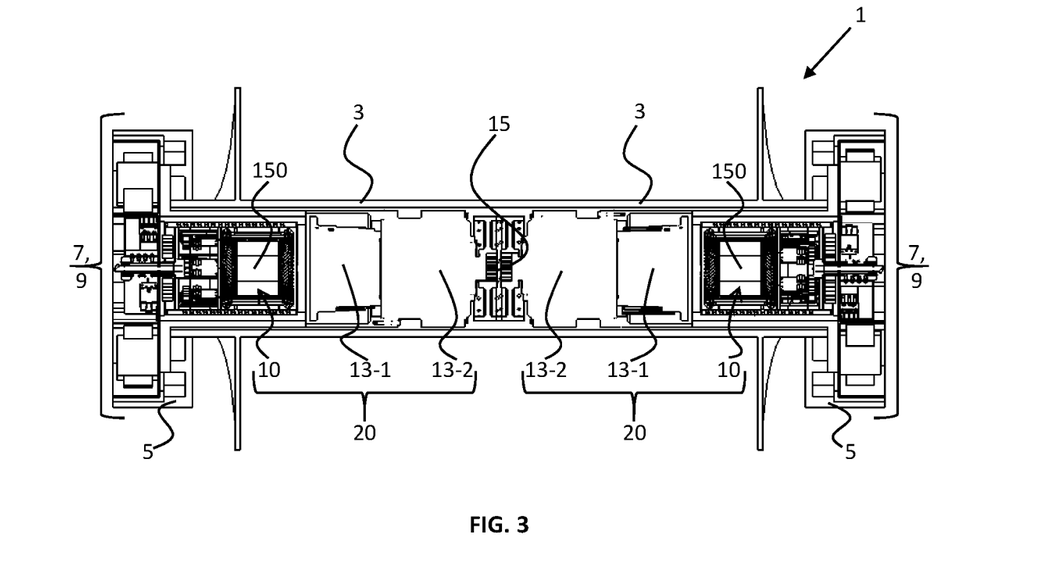
FIG. 3 shows a horizontal cross-sectional view of the winch of FIG. 1.
Figure 4:
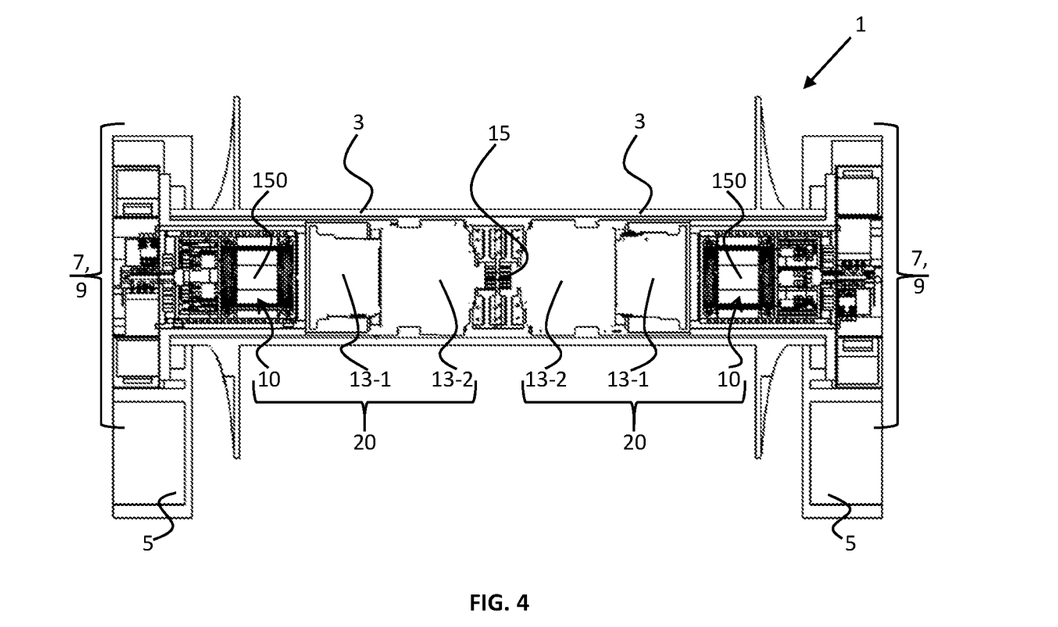
FIG. 4 shows a vertical cross-section view of the winch of FIG. 1.

FIG. 3 shows a horizontal cross-sectional view of the winch of FIG. 1. FIG. 4 shows a vertical cross-section view of the winch of FIG. 1. These figures show that there is two electric motors 10 provided within the winch drum 3. Nevertheless, what is important in high-performance electric winches, for instance the once used on ships and on rigs, is very high torque levels. A prototype winch had a pulling power of 45 tons and delivered a maximum torque of 100 kNm. This winch may be scaled up to 120 tons@420 kNm for a winch with a 700 mm drum diameter with 2 electric motors having 8 motor segments in each end. However, even bigger winches are possible having many hundreds of tons pulling power and delivering a maximum torque of several thousand kNm. These torque levels are obtained by implementing gear systems, which in this invention also are advantageously integrated into the same winch drum 3. Each electric motor 10 is provided with a motor encoder 150 (controller) and is coupled with its drive shaft to the winch drum 3 via a variable gear 13-1 and a main reduction gear 13-2 as illustrated. The main reduction gear 13-2 is mechanically coupled with its drive shaft to the winch drum via a mechanical coupling 15. The mechanical coupling 15 may in fact be shared between both main gear systems 13-2. The electric motor 10 and the gears 13-1, 13-2 form part of one integrated assembly, which is referred to as motor-gear assembly 20.

Figure 5:
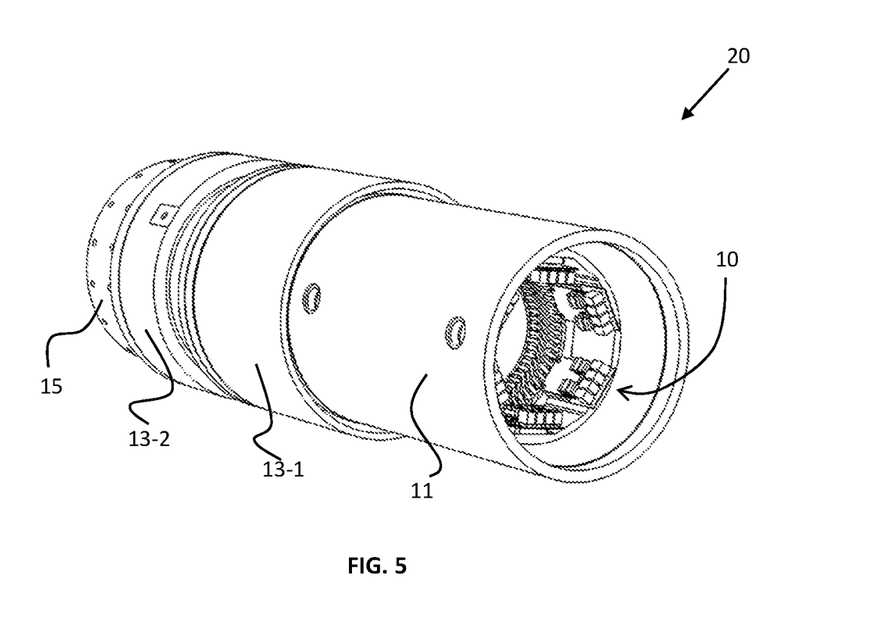
FIG. 5 shows a motor-gear assembly as used in FIG. 1.
Figure 6:
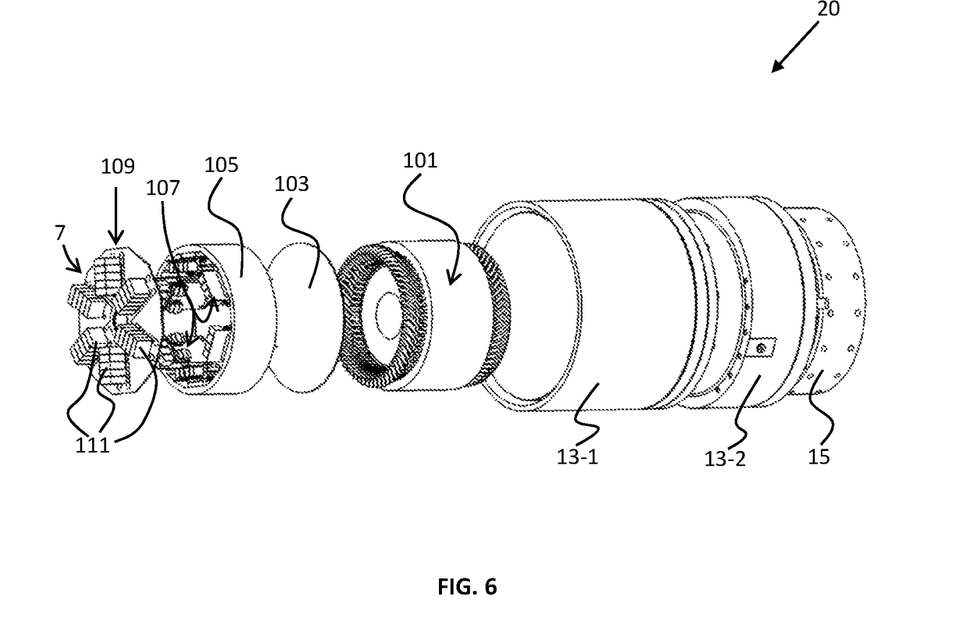

FIG. 5 shows such motor-gear assembly (also as used in FIG. 1). The figure also shows the motor housing 11 that is provided around the electric motor 10. FIG. 6 shows an exploded view of the motor-gear assembly of FIG. 5, wherein the motor housing 11 is left out for illustrative purposes. This exposes the stator-rotor assembly 101 and the other parts that are connected to it. There is also shown an explosion proof bulkhead 103 with penetrations (not shown) for the connections to the stator winding wires. The function of the explosion proof bulkhead is to prevent damage to the rotor, stator and stator windings in case of a component failure in the power electronics that leads to short-circuit and arc-damage. FIG. 6 further shows a part 105 of the motor housing 11, which contains some driver circuitry 107 (which comprises a plurality of driver modules, one for each phase of the electric motor). The row of components in FIG. 6 shows an assembly of electronic components 109, such as capacitor banks 111 that are mounted on DC-buses. The assembly of electronic components could be made as printed circuit board (as shown in the figures), hybrid circuit, custom integrated circuit (Custom IC), system on a chip (SOC) and could also contain programmable circuits like FPGA, CPLD, etc.

Figure 7:
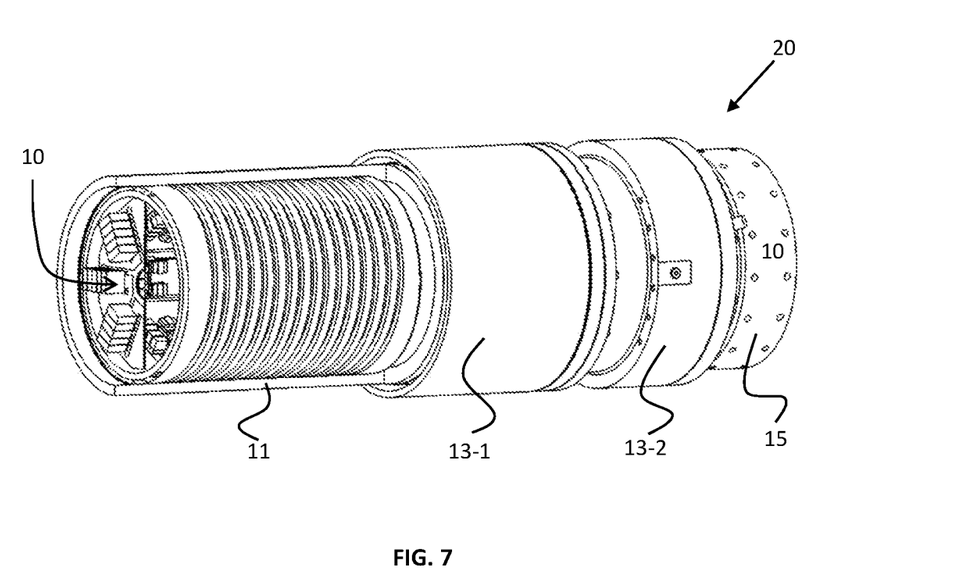
FIG. 7 shows a cut-out view of the motor-gear assembly of FIG. 5.
Figure 8:
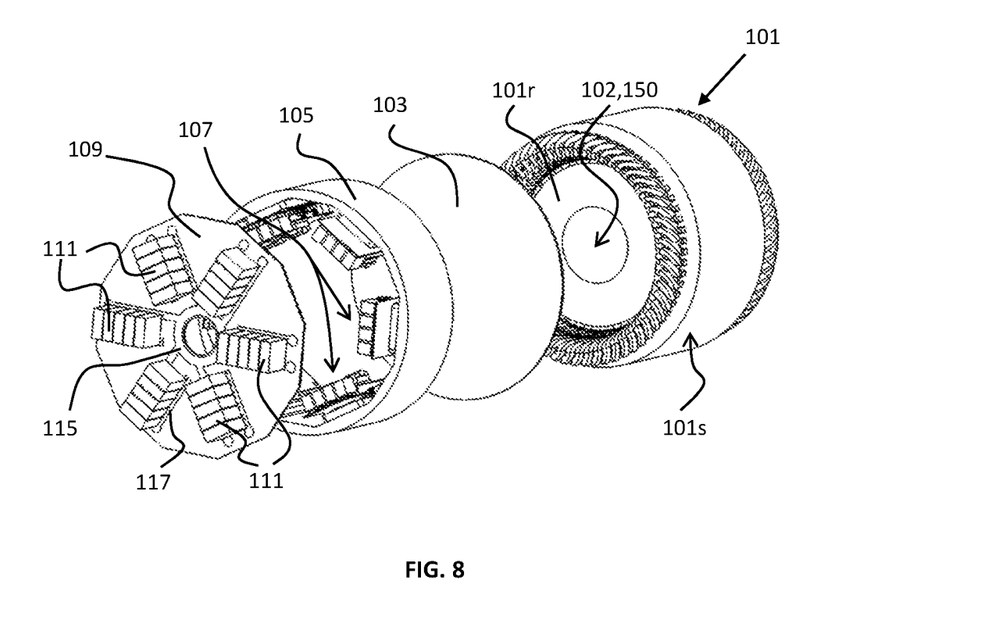
FIG. 8 shows an exploded view of part of the motor-gear assembly of FIG. 5.

FIG. 7 shows a cut-out view of the motor-gear assembly of FIG. 5. It shows that the motor housing 11 comprises of two parts with channels for circulation of cooling fluid. FIG. 8 shows an exploded view of part of the motor-gear assembly of FIG. 5. FIG. 8 more clearly illustrates a rotor 101*r* within a stator 101*s* within the stator-rotor assembly 101. Within the rotor 101*r* there is a space 102, which has very low EMI and is therefore very suitable for housing electronic components (not shown). Another feature that is more clearly illustrated in FIG. 8 is the assembly of electronic components 109. Some of the electronics, i.e. capacitor banks 111, on the assembly of electronic components 109 are connected between respective first power supply lines 115 (typically connected to the electric "−") and respective second power supply lines 117 (typically connected to electric "+"). The first power supply line 115 and the second power supply line 117 are also referred to as DC-bus.

Figure 9:
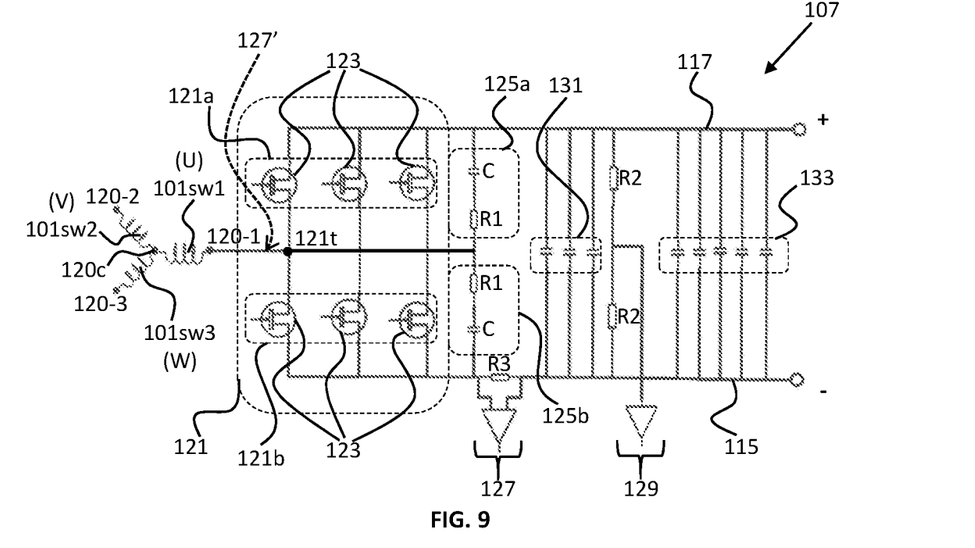
FIG. 9 shows an electric circuit diagram of a driver module of the invention.

FIG. 9 shows an electric circuit diagram of a driver module of the invention. The figure shows three stator windings 101*sw*1 . . . 101*sw*3, also being referred to as the U, V and W-stator windings, respectively. There are shown three stator windings (forming effectively one motor segment), but when the motor diameter is larger there may be more motor segments and thus more stator windings, for example six (2×3) stator windings as illustrated in other drawings. By way of example, when the motor diameter is about 700 mm, and when using a three-phase synchronous motor as illustrated, it could for example be 8 motor segments and thus 24 stator windings. The electric circuit diagram illustrates the circuit for only one driver module 107. In any case, in the invention each driver module 107 drives one of said stator windings as illustrated. In this embodiment the stator windings 101*sw*1 . . . 101*sw*3 are connected in a star network such that each winding is connected between a common electric node 120*c* (midpoint of the star network) and a respective end terminal 120-1 . . . 120-3 as illustrated. Alternatively, the stator windings 101*sw*1 . . . 101*sw*3 could have been connected in a delta network.

There is further shown an inverter half bridge 121 connected between the second power supply lines 115, 117 and an output terminal 121*t* that is connected with the respective stator winding 101*sw*1. The inverter half bridge 121 comprise a two transistor stacks 121*a*, 121*b* as illustrated. Each transistor stack 121*a*, 121*b* comprises a plurality of silicon-carbide transistors 123 as illustrated. In practise, each silicon-carbide transistor 123 consist of the transistor itself and a flywheel diode (not shown) connected in parallel with the transistor high current path (source-drain), but these flywheel diodes have been left out to render the figure more clear. This is considered to be knowledge know by the person skilled in the art. The reason why a plurality of silicon-carbide transistors 123 (MOSFETs) is connected in parallel is to illustrate that a large output current (high-power) is required and this can be obtained by connecting multiple-transistors in parallel or by taking larger transistors. In FIG. 9 there is drawn three transistors in parallel, but in practise this may be any other number to reach the required driving current (gain). In fact, both transistor stacks 121*a*, 121*b* form an inverter circuit together, wherein the illustrated output terminal 121*t* is the output of the inverter and the gate signals on the transistors 123 are the input of the inverter. The gate signals in said inverter half-bridge 121 are typically generated by the earlier-mentioned controller 150 (illustrated FIGS. 3 and 4). Said controller (operating in the time domain) will, based on the sensor values (i.e. DC current, DC voltage, rotor position), perform mathematical calculations according to an algorithm and produce multiple time domain signals for controlling gates of driver modules switches 121*a*, 121*b* for creating a rotating magnetic field for driving the rotor 101*r*.

Parallel to each transistor stack 121*a*, 121*b* there is a respective snubber circuit 125*a*, 125*b*, which is there to reduce noise and unwanted waveforms when the transistors switch. Even though FIG. 9 shows the snubber circuit as a separate circuit parallel to the transistors 123. However, the person skilled in the art knows that a snubber circuit typically comprises electronic components such as semiconductors (i.e. diodes, transistors, etc.), and passive components like resistors, capacitors (for instance resistor R1 and a capacitor C as illustrated). In fact, the snubber circuit is formed by the combination of the plurality of silicon-carbide transistors 123, the earlier-mentioned flywheel diodes, and the resistor R1 and C will function as a snubber circuit.

In one embodiment the algorithm for controlling the gates of the transistors 123 uses the aforementioned measured DC-current and DC-voltage provided by the power supply lines 115, 117. FIG. 9 shows a possible implementation of a DC-current sensor 127 (to be provided within one of the power supply lines 115, 117 for instance by a resistor R3 over which a voltage is measured by an amplifier as illustrated) and a DC-voltage sensor 129 (to be connected between said power supply lines 115, 117 via for instance two resistors R2 as illustrated). FIG. 9 also shows alternative location 127' for the AC current sensor. It must be stressed that there are also other options for placing the current sensor. For example, the current sensor could be embedded with the main current path of the transistors 123. The current sensor could also be mounted close to said main current path measuring the magnetic field surrounding the main current path. It does not really matter as long as the current is measured somehow. The drive module 107 in FIG. 9 further comprises a first capacitor bank 131 (also called the local capacitor bank) and a second capacitor bank 133 as illustrated.

Figure 10:
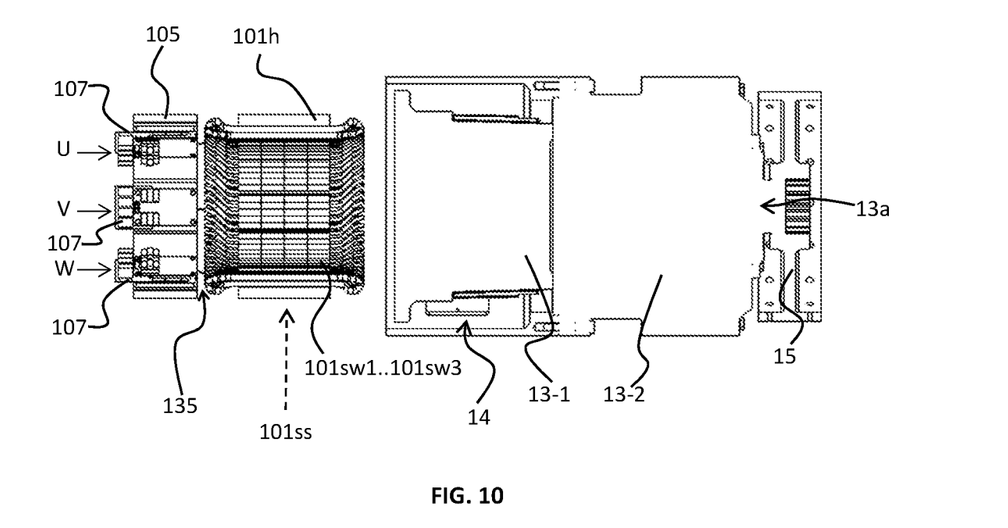
FIG. 10 shows some of the parts of the motor-gear assembly of FIG. 5.

FIG. 10 shows some of the parts of the motor-gear assembly of FIG. 5. It shows how the stator windings 101*sw*1 . . . 101*sw*3 are provided within a stator stack 101*h*, and how said driver modules are provided within said earlier mentioned part 105 of the motor stack. A further important thing, which is illustrated, is how close the driver modules 107 are provided to the stator windings 101*sw*1 . . . 101*sw*3. Consequently the electrical connections 135 are very short (and have a very low-impedance). The figure further illustrates that the variable gear 13-1 cooperates with electric gearshift actuator 14 (albeit a bit schematic). Furthermore, the main gear 13-2 is coupled to the mechanical coupling 15 via a main gear output shaft 13*a* as illustrated.

Figure 11:
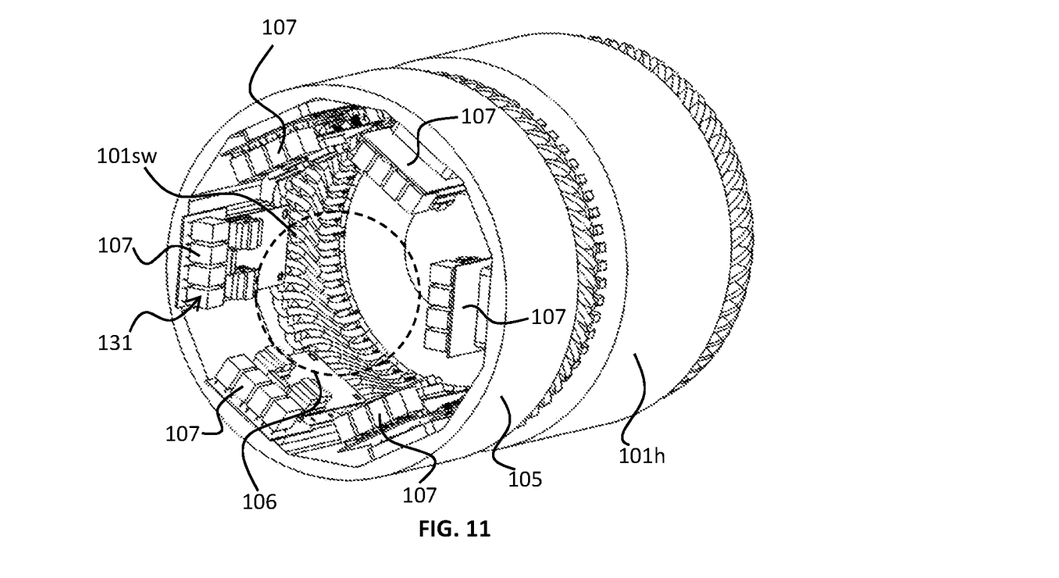
FIG. 11 shows the rotor-stator assembly of the motor-gear assembly of FIG. 5.
Figure 12:
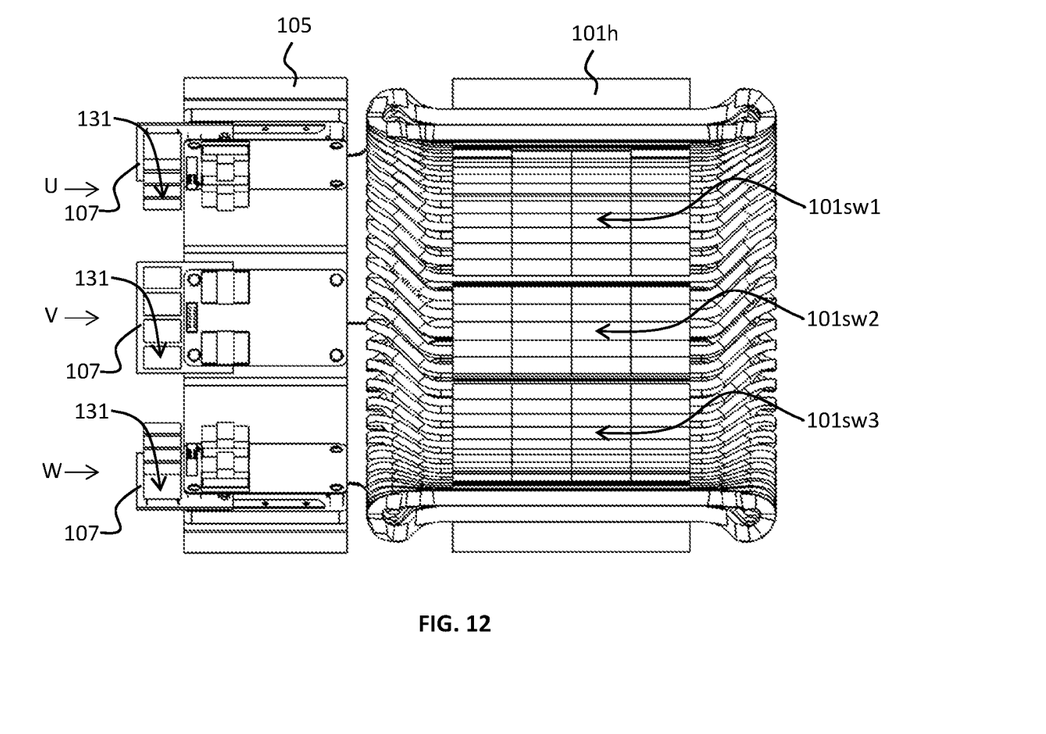
FIG. 12 shows one segment out of the rotor-stator assembly of FIG. 11.

FIG. 11 shows the rotor-stator assembly of the motor-gear assembly of FIG. 5. FIG. 12 shows one segment out of the rotor-stator assembly of FIG. 11. These figures mainly serve to show parts that are already discussed with reference to other figures. In FIG. 11 the plurality of stator windings are referred to with a single reference number 101*sw*. The figure further illustrates an alternative space 106 in between the plurality of driver modules 107, where the motor encoder and the controller (not shown) can be placed (instead of within the space 102 within the rotor as illustrated in FIG. 8.

Figure 13:
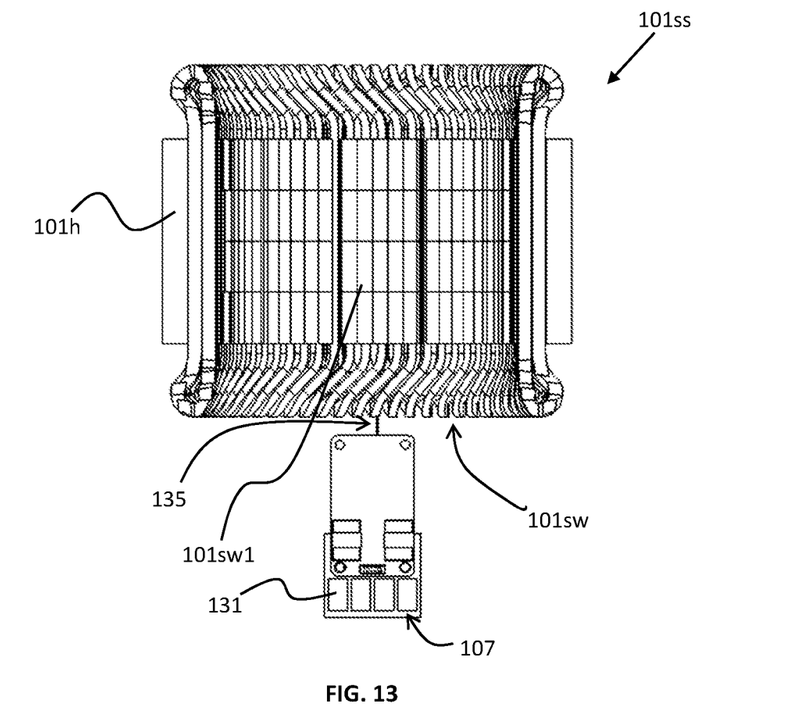
FIG. 13 shows the rotor-stator assembly of FIG. 12 in a simplified form with only one driver module.
Figure 14:
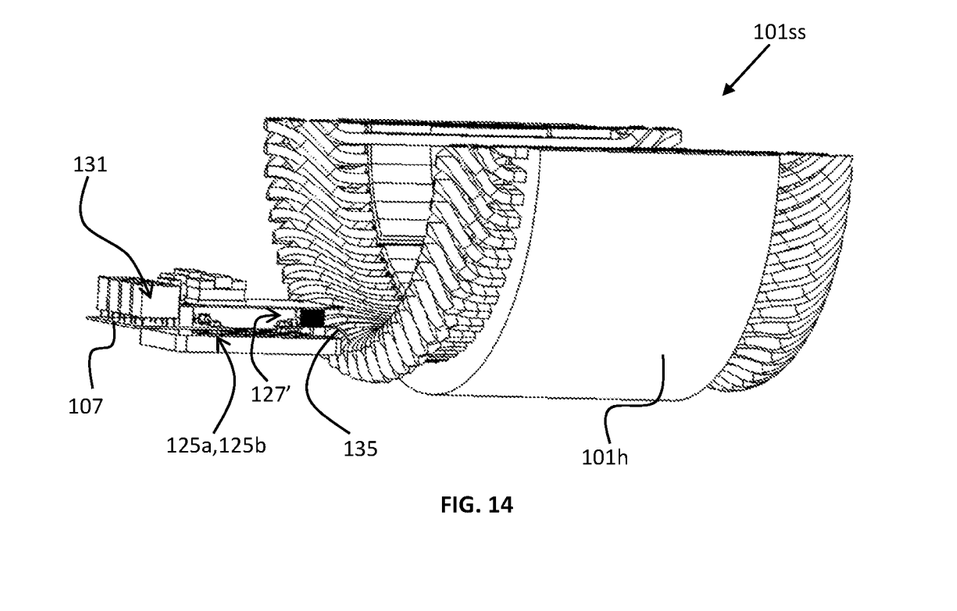
FIG. 14 shows the rotor-stator assembly of FIG. 13 from a different angle.

FIG. 13 shows the rotor-stator assembly of FIG. 12 in a simplified form with only one driver module. FIG. 14 shows the rotor-stator assembly of FIG. 13 from a different angle. These figures also mainly serve to show parts that are already discussed with reference to other figures. FIGS. 13 and 14 (but also FIGS. 11 and 12) actually show one stator segment 101ss, which comprises three phases in this embodiment. FIG. 14 further shows an alternative placement of a current sensor 127', namely in series with the short connection 135. It is very important that this connection 135 is very short such that it has a very low parasitic impedance and will reduce unwanted wave nature.

Figure 15:
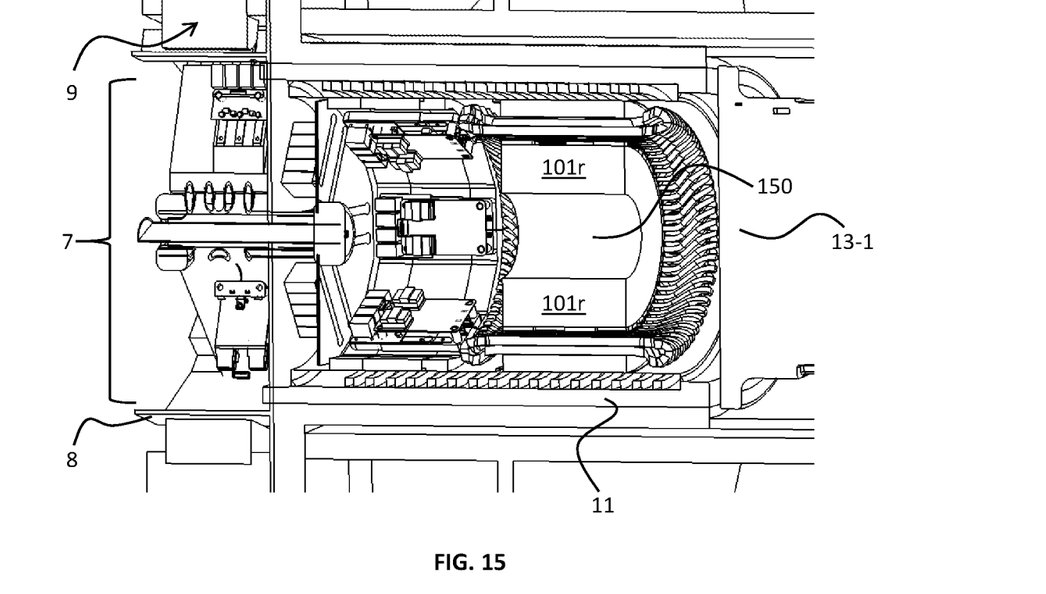
FIGS. 15-16 show enlarged partial cross-sectional views of the motor-gear assembly when mounted in the electric winch of FIG. 1.
Figure 16:
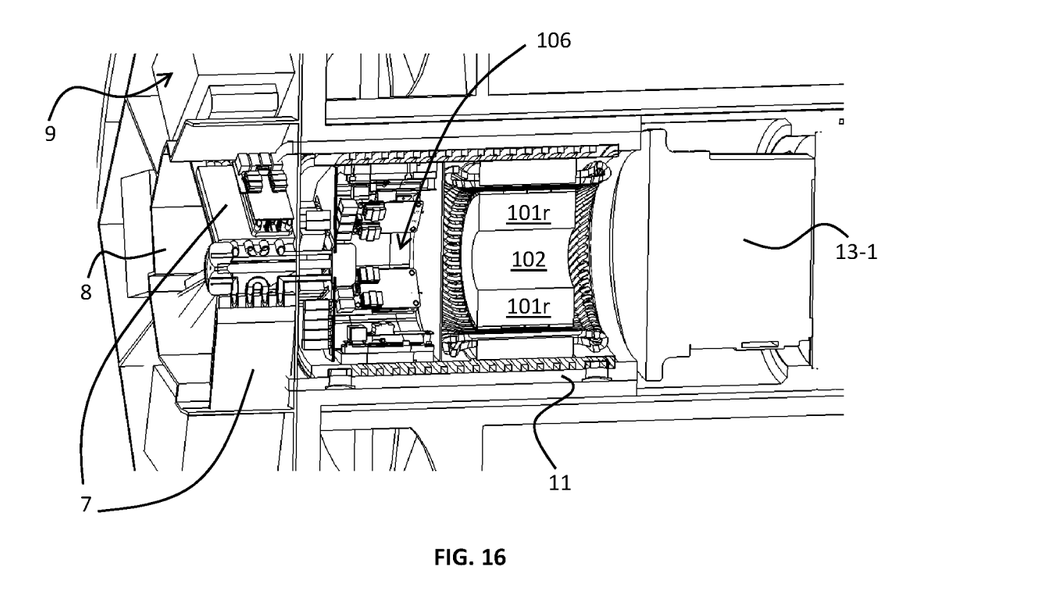

FIGS. 15-16 show enlarged partial cross-sectional views of the motor-gear assembly when mounted in the electric winch of FIG. 1. These figures serve to show parts that are already discussed with reference to other figures. In addition, these figures show magnetic and EMI-proof bulkheads to protect the circuitry inside against EMI, and reduce radiation of EMI. Also are shown inductors 9, which are common for filtering and boost converter energy storage.

By way of illustration, the invention can be used in inverters for any rotating machinery such as motors and generators. The invention can be used to integrate semiconductor switching components into filtering inductors and energy storing coils in for example rectifiers and frequency-voltage converters.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claim enumerating several means, several of these means may be embodied by one and the same item of hardware.

The invention claimed is:

1. An electric motor comprising a stator and a rotor for rotation relative to the stator, the stator comprising a plurality of stator windings distributed along the circumference of the stator, wherein each stator winding is connected to a respective end terminal, the electric motor further comprising driver circuitry coupled to the plurality of stator windings for creating a rotating magnetic field for driving the rotor, wherein the driver circuitry comprises one driver module per stator winding, wherein each driver module is mounted close to its respective stator winding, wherein each driver module is directly connected to the respective end terminal of its respective stator winding without an impedance of any significance being present in between said driver module and said stator winding.

2. The electric motor according to claim 1, wherein each driver module comprises an inverter circuit directly coupled with its output to the respective stator winding.

3. The electric motor according to claim 2, wherein each inverter circuit comprises a plurality of silicon-carbide transistors.

4. The electric motor according to claim 3, wherein each driver module further comprises a snubber circuit connected in parallel with the inverter circuit.

5. The electric motor according to claim 3, wherein each driver module further comprises a capacitance circuit connected in parallel with the inverter circuit.

6. The electric motor according to claim 2, wherein each driver module further comprises a snubber circuit connected in parallel with the inverter circuit.

7. The electric motor according to claim 6, wherein each driver module further comprises a capacitance circuit connected in parallel with the inverter circuit.

8. The electric motor according to claim 2, wherein each driver module further comprises a capacitance circuit connected in parallel with the inverter circuit.

9. The electric motor according to claim 8, wherein the capacitance circuit comprises a distributed capacitor bank.

10. The electric motor according to claim 9, wherein each driver module comprises a first power supply line and a second power supply line, and wherein the driver module is fed by a DC-voltage provided between the second supply line and the first supply line.

11. The electric motor according to claim 10, wherein the capacitance circuit is connected between said power supply lines.

12. The electric motor according to claim 11, further comprising a controller for controlling said inverter circuits.

13. The electric motor according to claim 10, further comprising a controller for controlling said inverter circuits.

14. The electric motor according to claim 13, further comprising a DC voltage sensor provided in between said power supply lines for measuring the power supply voltage, and a DC current sensor provided in one of said power supply lines or stator winding for measuring the load current, wherein the measured power supply voltage and the measured load current are fed to the controller for controlling said inverter circuits.

15. The electric motor according to claim 1, wherein each driver module is mounted besides the respective stator end terminal.

16. The electric motor according to claim 1, wherein the electric motor is a synchronous motor.

17. The electric motor according to claim 16, wherein the electric motor is a permanent magnet motor.

18. An electric winch comprising at least one electric motor comprising a stator and a rotor for rotation relative to the stator, the stator comprising a plurality of stator windings distributed along the circumference of the stator, wherein each stator winding is connected to a respective end terminal, the electric motor further comprising driver circuitry coupled to the plurality of stator windings for creating a rotating magnetic field for driving the rotor, wherein the driver circuitry comprises one driver module per stator winding, wherein each driver module is mounted close to its respective stator winding, and wherein each driver module is directly connected to the respective end terminal of its respective stator winding without an impedance of any significance being present in between said driver module and said stator winding wherein, the at least one electric motor is integrated within a winch drum of the electric winch.

19. An electric motor comprising a stator and a rotor for rotation relative to the stator, the stator comprising a plurality of stator windings distributed along the circumference of the stator, wherein each stator winding comprises at least one coil of a conductor and is connected to a respective end terminal, the electric motor further comprising driver circuitry coupled to the plurality of stator windings for creating a rotating magnetic field for driving the rotor, wherein the driver circuitry comprises one driver module per stator winding, wherein each driver module is mounted close to its respective stator winding, wherein each driver module is directly connected to the respective end terminal of its respective stator winding without an impedance of any significance being present in between said driver module and said stator winding.

\* \* \* \* \*